UNITED STATES PATENT OFFICE.

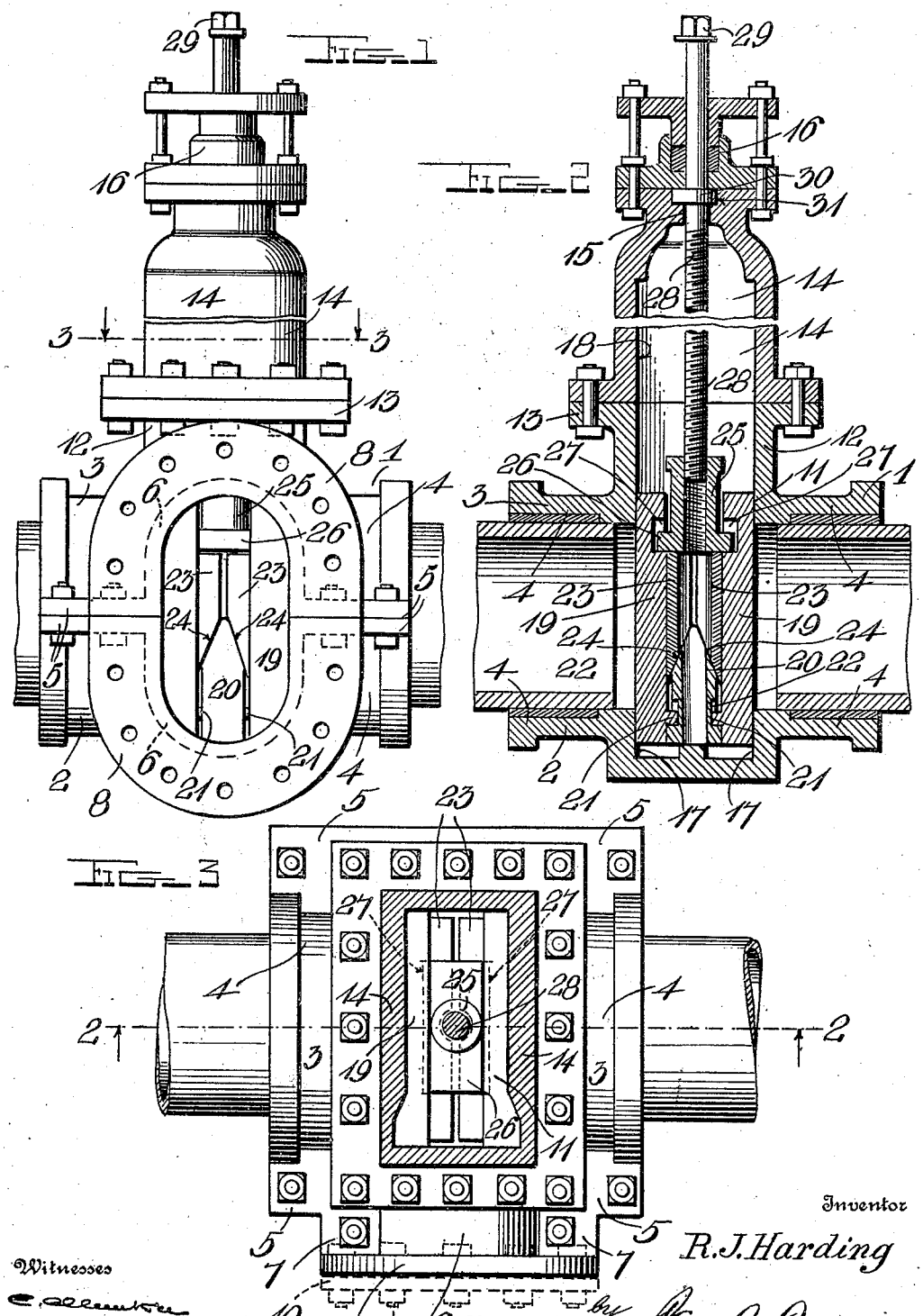

ROBERT J. HARDING, OF POUGHKEEPSIE, NEW YORK.

SPLIT T-VALVE.

No. 929,589.　　　　Specification of Letters Patent.　　　Patented July 27, 1909.

Application filed April 5, 1909. Serial No. 488,008.

*To all whom it may concern:*

Be it known that I, ROBERT J. HARDING, a citizen of the United States, residing at Poughkeepsie, in the county of Dutchess and State of New York, have invented new and useful Improvements in Split T-Valves, of which the following is a specification.

This invention relates to improvements in split tee valves.

The object of the invention is to provide a valve having a split or separable casing, whereby the same may be readily applied to a pipe without removing the same, and having means whereby a branch pipe may be connected by said casing to the main pipe.

A further object is to provide an improved form of valve disks, and means for operating the same.

With the foregoing and other objects in view, the invention consists of certain novel features of construction, combination and arrangement of parts, as will be more fully described and particularly pointed out in the appended claims.

In the accompanying drawings: Figure 1 is a side view of a valve constructed in accordance with my invention. Fig. 2 is a central vertical sectional view of the same on the line 2—2 of Fig. 3. Fig. 3 is a horizontal sectional view on the line 3—3 of Fig. 1.

In the embodiment of my invention I provide a casing 1 comprising a lower section 2, and an upper section 3, the body portions of which when placed together form a rectangular casing. On the opposite ends of the upper and lower sections are formed semi-cylindrical or half socket members 4 which when the sections are brought together form sockets which engage the ends of the pipe to which the valve is applied. The socket members 4 are provided with laterally projecting apertured flanges 5, which are bolted around the pipe. The socket members after being thus engaged with the ends of the pipe are calked into fluid tight engagement therewith.

In addition to the socket members 4, the upper and lower sections of the casing are provided on one side with additional upper and lower semi-elliptical socket members 6, which are provided with lateral apertured flanges 7 adapted to be bolted together, as shown. The outer ends of the side socket members 6 are further provided with radial flanges 8, which when the socket members are brought together form an elliptical flange which is provided with a series of bolt holes to receive the clamping bolts 9 of a removable stop or closing plate 10, whereby the side socket may be closed when not employed for connecting a branch pipe with the main pipe.

In the side of the upper member 3 of the casing is formed an opening 11 which is preferably of oblong rectangular shape and is surrounded by a vertical projection 12, having on its upper end a laterally projecting flange 13, provided with a series of bolt holes. On the upper end of the projections 12 is bolted a rectangular hollow dome 14, in the upper end of which is formed a guide passage 15 and to said upper end is secured a stuffing box 16.

In the inner walls of the upper and lower sections of the valve casing are formed recesses or valve seats 17 with which communicate similar seats 18 formed in the inner side walls of the dome 14. Slidably mounted in the seats 17 and 18 of the casing and dome are elongated valve disks or plates 19 which are preferably formed of greater thickness at their edges adjacent to the branch connection of the casing, as is clearly shown in Fig. 3 of the drawings. The purpose of this increased thickness of the valve disks will be hereinafter described.

Between the disks at the lower portions thereof is arranged an expanding block 20, which is loosely connected to the disks by means of lugs 21 formed on the inner sides of the disks, and which are adapted to engage elongated recesses 22, formed in the opposite sides of the block, as shown. The block 20 is provided with a tapered or wedge-shaped upper end as clearly shown in Fig. 2 of the drawings. Between the valve disks above the expanding block 20 are disks clamping wedge blocks 23, the inner sides of which adjacent to their lower edges are beveled or inclined at 24 to engage the wedge-shaped upper end of the expanding block 20, whereby when said wedge blocks are forced downwardly, said upper end of the expanding block will force the wedge blocks laterally, thereby crowding or clamping the disk plates into fluid tight engagement with their seats.

Between the valve disks above the wedge blocks 23 is arranged an interiorly threaded socket 25, having on its lower end a rectangular flange 26, which is loosely engaged with elongated notches or recesses 27 formed in the inner side walls of the valve disks. By forming notches or recesses 27 of greater length than the width of the flange 26, the latter is given sufficient play to force the wedge blocks 23 into operative engagement with the expanding block. With the socket 25 is engaged the threaded lower end of a valve operating rod or stem 28, which projects upwardly through the dome and the aperture 15, and through the stuffing box 16 and is provided on its upper end with a square head or nut 29 with which is adapted to be engaged a wrench or operating handle for revolving the stem and thereby actuating the valve disks. On the valve operating rod or stem 28, adjacent to the upper end of the dome 14 is formed an annular collar 30, which is adapted to engage an annular recess 31 formed in the upper end of the dome. The collar 30 is held in rotative engagement with the recess 31 by the lower portion of the stuffing box 16, thereby holding the operating rod 28 against longitudinal movement and permitting the same to be freely turned to move the valve operating devices up and down in the valve casing and dome, thus providing for the opening and closing of the valve. The engagement of the flange 26 with the recesses 27 in the valve disk provides for the raising and lowering of the disks by the operating rod while the engagement of the lugs 21 on the inner side of the valve disks with the recesses 22 in the expanding block provides for the raising of the same, and the wedge blocks, so that when the valve disks are raised to their upper position in the dome, both the expanding block and the wedge blocks are also carried up, thus leaving an unobstructed space for the passage of the fluid through the valve casing.

This valve is particularly adapted for use in connection with pipes, which are to be tapped or cut to receive the valve without removing or disconnecting any of the sections of the pipe, and the valve is especially designed for use in connection with my valve inserting machine, application for patent on which bears the filing date of the present application, April 5, 1909 and the Serial No. 488,009. In this application, a valve casing such as disclosed in the present application is attached to a pipe with the disks drawn up in the bonnet. A cutting attachment is then secured to the branch coupling and a cutter which is carried thereby, is rotated and forced forward through the enlarged portions of the seats to cut out sections of the pipe. This cutter is moved vertically in the branch coupling so as to make sufficient cuts to completely divide the section of pipe and is wider than the narrow portions of the seats whereby the disks may readily pass.

It will be noted that the valve disk or plates 19 in the present application, are shown and described as being of greater thickness at their edges adjacent to the branch connection of the tee casing, in order to fill the enlarged opening made to receive the cutter.

Inasmuch as the section cut from the pipe, by the inserting machine hereinbefore referred to, is made by a series of circular cuts, the opening formed thereby will not have as great a width for the passage of the valve disks as the diameter of the cutter of the inserting machine, therefore if the valve disks were not provided with a greater thickness at the edge, as shown and described, a cutter of sufficient size to cut an opening in the pipe large enough for the disks to lower, could not enter between the seats of the disks.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention what I claim as new is:

1. A valve having a split or separable tee casing adapted to be engaged with a pipe and to form a branch connection therewith, valve seats formed in the casing, a dome arranged on the upper side of said casing, valve disks slidably mounted in said seats, and having a greater width adjacent to the branch connection of the casing, an expanding block arranged between said valve disks and loosely connected thereto, wedge blocks arranged between said expanding block and said disks, a valve reciprocating rod revolubly mounted in said dome, and means on the inner end of said rod to operatively engage said wedge blocks and to loosely connect said rod with said valve disk, whereby the latter are reciprocated into operative and inoperative positions in said casing and dome.

2. A valve having a split tee casing, a hollow dome arranged on and communicating with said casing, a stuffing box arranged on the upper end of said dome, valve disks slidably mounted in said casing, said disks having formed in their side elongated notches, lugs formed on the inner side of said disk, an expanding block arranged between said disks and having formed in its opposite side elongated notches to receive the lugs on said disks, whereby the block is reciprocated with the disks, a tapered upper end formed on said block, disk clamping blocks having beveled or wedge shaped lower ends adapted to be engaged with the tapered upper end of said expanding block, whereby said clamping blocks are expanded laterally and into operative engagement with said valve disks, an interiorly threaded socket having means thereon to engage the elongated notches in said valve disk and to force said clamping blocks into operative engagement with said expanding block, an operating rod having a threaded engagement with the said socket, whereby the latter and the parts connected thereto are raised and lowered to inoperative and operative positions respectively, and means whereby said rod is revolubly mounted in said dome and held against longitudinal movement.

3. In a valve of the character described, a tee casing formed in separable sections adapted to be operatively engaged with a pipe, valve seats formed in said casing, valve disks slidably engaged with said seats, said disks having an increased thickness along their edges adjacent to the tee or branch of the casing, and means to operate said valve disks.

4. In a valve of the character described, a casing formed in separable sections and having a branch connection, said branch connection having an elongated passage and opening, means to close said passage, valve seats in said casing, valve disks slidably engaged with said seats, said disks having an increased thickness at their edges adjacent to said branch connection, and means to operate said valve disks.

In testimony whereof I have signed my name to this specification in the presence of two subscribing witnesses.

ROBERT J. HARDING.

Witnesses:
    ALICE B. COX,
    R. J. SHIELDS.